United States Patent
Milette et al.

(10) Patent No.: US 7,811,006 B2
(45) Date of Patent: Oct. 12, 2010

(54) FIELD INSTALLABLE FIBER OPTIC CONNECTOR AND INSTALLATION TOOL

(75) Inventors: Luc Milette, Montreal (CA); Moise Levy, Laval (CA); Yannick Demers, Saint-Jean-sur-Richelieu (CA)

(73) Assignee: Belden CD (Canada) Inc., Saint-Laurent (CA)

( * ) Notice: Subject to any disclaimer, the term of this patent is extended or adjusted under 35 U.S.C. 154(b) by 0 days.

(21) Appl. No.: 12/552,830

(22) Filed: Sep. 2, 2009

(65) Prior Publication Data

US 2010/0054670 A1    Mar. 4, 2010

Related U.S. Application Data

(60) Provisional application No. 61/093,559, filed on Sep. 2, 2008.

(51) Int. Cl.
*G02B 6/36* (2006.01)
(52) U.S. Cl. .............................. 385/76; 385/83; 385/136
(58) Field of Classification Search .................. 385/76, 385/83, 136
See application file for complete search history.

(56) References Cited

U.S. PATENT DOCUMENTS

| | | | |
|---|---|---|---|
| 4,146,301 A | 3/1979 | Cherin et al. |
| 4,669,820 A | 6/1987 | Ten Berge |
| 4,824,197 A | 4/1989 | Patterson |
| 4,923,274 A | 5/1990 | Dean |
| 4,973,126 A | 11/1990 | Degani et al. |
| 5,040,867 A | 8/1991 | de Jong et al. |
| 5,102,212 A | 4/1992 | Patterson |
| 5,138,681 A | 8/1992 | Larson et al. |
| 5,159,653 A | 10/1992 | Carpenter et al. |
| 5,159,655 A | 10/1992 | Ziebol et al. |
| 5,179,608 A | 1/1993 | Ziebol et al. |
| 5,189,717 A | 2/1993 | Larson et al. |
| 5,381,500 A | 1/1995 | Edwards et al. |
| 5,394,496 A | 2/1995 | Caldwell et al. |
| 5,440,657 A | 8/1995 | Essert |
| 5,963,699 A | 10/1999 | Tanaka et al. |
| 5,984,532 A | 11/1999 | Tamaki et al. |
| 6,022,150 A | 2/2000 | Erdman et al. |
| 6,179,482 B1 | 1/2001 | Takizawa et al. |
| 6,234,685 B1 | 5/2001 | Carlisle et al. |
| 6,604,867 B2 | 8/2003 | Radek et al. |
| 6,773,167 B2 | 8/2004 | Scanzillo |
| 7,011,454 B2 | 3/2006 | Caveney et al. |

(Continued)

FOREIGN PATENT DOCUMENTS

WO        2008051030 A1    5/2008

*Primary Examiner*—Ellen Kim
(74) *Attorney, Agent, or Firm*—Goudreau Gage Dubuc; Hugh Mansfield (57) ABSTRACT

A connector for reversibly terminating a cable comprising a buffer cladding surrounding an optical fiber wherein an end portion of the cable is exposed to reveal the optical fiber. The connector comprises a clamping assembly comprising a splice anvil comprising a fiber clamping surface positioned facing a member surface and overlapping a stub splicing face and an optical fiber splicing face. The clamping assembly is adapted for opening by applying a tangential force to the splice anvil, illustratively through engaging an actuating boss with a tool inserted through the opening and applying a force to the actuating boss such that the clamping surface is moved away from the member surface against a spring.

11 Claims, 8 Drawing Sheets

U.S. PATENT DOCUMENTS

| | | |
|---|---|---|
| 7,014,372 B2 | 3/2006 | Watte et al. |
| 7,066,656 B2 | 6/2006 | Demissy et al. |
| 7,104,702 B2 | 9/2006 | Barnes et al. |
| 7,121,731 B2 | 10/2006 | Weynant et al. |
| 7,178,990 B2 | 2/2007 | Caveney et al. |
| 7,195,400 B2 | 3/2007 | Asano et al. |
| 7,204,644 B2 | 4/2007 | Barnes et al. |
| 7,241,056 B1 | 7/2007 | Kuffel et al. |
| 7,258,496 B2 | 8/2007 | Saito et al. |
| 7,264,410 B1 | 9/2007 | Doss et al. |
| 7,270,487 B2 | 9/2007 | Billman et al. |
| 7,280,733 B2 | 10/2007 | Larson et al. |
| 7,346,255 B2 | 3/2008 | Yamaguchi et al. |
| 7,346,256 B2 | 3/2008 | Marrs et al. |
| 7,347,627 B2 | 3/2008 | Saito et al. |
| 7,369,738 B2 | 5/2008 | Larson et al. |
| 2005/0063645 A1 | 3/2005 | Carpenter et al. |
| 2005/0105871 A1 | 5/2005 | Staupendahl et al. |
| 2005/0238292 A1 | 10/2005 | Barnes et al. |
| 2006/0002662 A1 | 1/2006 | Manning et al. |
| 2006/0153515 A1 | 7/2006 | Honma et al. |
| 2007/0047883 A1 | 3/2007 | Watte et al. |
| 2007/0127872 A1 | 6/2007 | Caveney et al. |
| 2007/0172179 A1 | 7/2007 | Billman et al. |
| 2007/0196054 A1 | 8/2007 | Palmer et al. |
| 2007/0286554 A1 | 12/2007 | Kuffel et al. |
| 2007/0286563 A1 | 12/2007 | Wagner et al. |
| 2007/0297746 A1 | 12/2007 | Carpenter et al. |
| 2008/0013891 A1 | 1/2008 | Nishioka et al. |
| 2008/0019646 A1 | 1/2008 | deJong |
| 2008/0044137 A1 | 2/2008 | Luther et al. |
| 2008/0044144 A1* | 2/2008 | Doss et al. .................... 385/98 |
| 2008/0118205 A1 | 5/2008 | Furuyama |
| 2008/0118206 A1 | 5/2008 | Wagner et al. |
| 2008/0175541 A1 | 7/2008 | Lu et al. |
| 2010/0046892 A1* | 2/2010 | Milette et al. ................. 385/83 |

* cited by examiner

FIG-4A

FIG_4B

FIG-5A

FIG_5B

US 7,811,006 B2

FIELD INSTALLABLE FIBER OPTIC CONNECTOR AND INSTALLATION TOOL

CROSS REFERENCE TO RELATED APPLICATIONS

This application claims priority, under 35 U.S.C. §119(e), of U.S. provisional application Ser. No. 61/093,559, filed on Sep. 2, 2008 which is incorporated herein in its entirety by reference.

FIELD OF THE INVENTION

The present invention relates to a field installable fiber optic connector and installation tool. In particular, there is provided a fiber optic connector, which can be used to terminate a fiber optic cable in the field and through the use of the installation tool.

BACKGROUND OF THE INVENTION

Fiber optic systems are well-known for their difficult terminations. In particular, alignment of mating optical fibers within a fiber optic connector is critical to the connector's performance. To accurately align an optical fiber stub of a connector with a mating field optical fiber inserted into the connector, a biasing force is typically applied to at least one mechanical splice component comprised within the connector. In this manner, the optical fiber stub and the field optical fiber are both retained between opposing splice components, which are biased together by an actuator. Once the optical fibers are aligned and retained in optical continuity, the field optical fiber is then strain relieved to the connector by crimping a buffered portion of the field fiber.

Prior art connectors are however complex as fiber alignment and strain relief are typically performed in more than one step using more than one element of the connector, thus requiring additional materials and proving time and cost consuming. Another drawback is that the termination assembly is typically non-reusable since once the optical fibers have been strain relieved by applying a crimp, it is usually not possible to reverse the splice without destroying the connector assembly or damaging the optical fiber. Indeed, the crimping operation has the tendency to pull the field fiber and fiber stub apart or damage the signal-passing function of the interface.

What is therefore needed, and an object of the present invention, is an easy to use fiber optic connector that reversibly and non-destructively terminates a field fiber inserted therein, thus alleviating the need for a second operation to crimp on the fiber cable.

Additionally, reversible prior art connectors typically use tools which expose the field fiber and fiber stub during operation, thereby allowing for the ingress of dirt and moisture and the like between the mating surfaces of the field fiber and fiber stub.

Therefore what is also needed, and also an object of the present invention, is a reversible fiber optic connector that avoids contamination through the ingress of dirt and moisture and the like.

SUMMARY OF THE INVENTION

More specifically, in accordance with the present invention, there is provided a connector for reversibly terminating a cable comprising a buffer cladding surrounding an optical fiber wherein an end portion of the cable is exposed to reveal the optical fiber. The connector comprises an elongate member comprising a first end, a second end and an alignment groove extending at least partially along a member surface thereof between the first end and the second end, wherein the exposed optical fiber is positioned within the groove and extending from the second end, a ferrule comprising a front face, a rear end positioned adjacent the first end, an axial bore aligned with the groove and an optical fiber stub disposed in the bore and extending from the front face into the groove such that a stub splicing face of the optical fiber stub is positioned opposite an optical fiber splicing face of the optical fiber, a clamping assembly comprising a splice anvil comprising a fiber clamping surface positioned facing the member surface and overlapping the stub splicing face and the optical fiber splicing face and an actuating boss attached to a long edge of the splice anvil, a spring for biasing the clamping surface towards the member surface, and a housing encompassing the elongate member, the clamping assembly and the spring wherein the elongate member and an inside of the housing comprise cooperating features preventing the elongate member from rotating within the housing, the housing further comprising an opening positioned adjacent the actuating boss. The clamping assembly is adapted for opening by engaging the actuating boss with a tool inserted through the opening and applying a force to the actuating boss such that the clamping surface is moved away from the member surface against the spring.

There is also provided a connector assembly for reversibly terminating a cable comprising a buffer cladding surrounding an optical fiber wherein the cladding is removed from an end portion of the cable to reveal the optical fiber. The assembly comprises an elongate member comprising a first end, a second end and an alignment groove extending at least partially along a member surface thereof between the first end and the second end, wherein the exposed optical fiber is positioned within the groove and extending from the second end, a ferrule comprising a front face, a rear end positioned adjacent the first end, an axial bore aligned with the groove and an optical fiber stub disposed in the bore and extending from the front face into the groove such that a stub splicing face of the optical fiber stub is positioned opposite an optical fiber splicing face of the optical fiber, a clamping assembly comprising a splice anvil comprising a fiber clamping surface positioned facing the member surface and overlapping the stub splicing face and the optical fiber splicing face, a spring for biasing the clamping surface towards the member surface, and a housing encompassing the elongate member, the clamping assembly and the spring wherein the elongate member and an inside of the housing comprise cooperating features preventing the elongate member from rotating within the housing. When the housing is secured and a force is applied to a first long edge of the splice anvil in a direction tangential to the axial bore and away from the member surface, the splice anvil rotates about a second long edge of the splice anvil in contact with the elongate member and the clamping surface is moved away from the member surface against the spring.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIG. 3b is a reversed perspective view of the anvils of the ferrule holding member of FIG. 3a;

DETAILED DESCRIPTION OF THE ILLUSTRATIVE EMBODIMENTS

Figure 1:
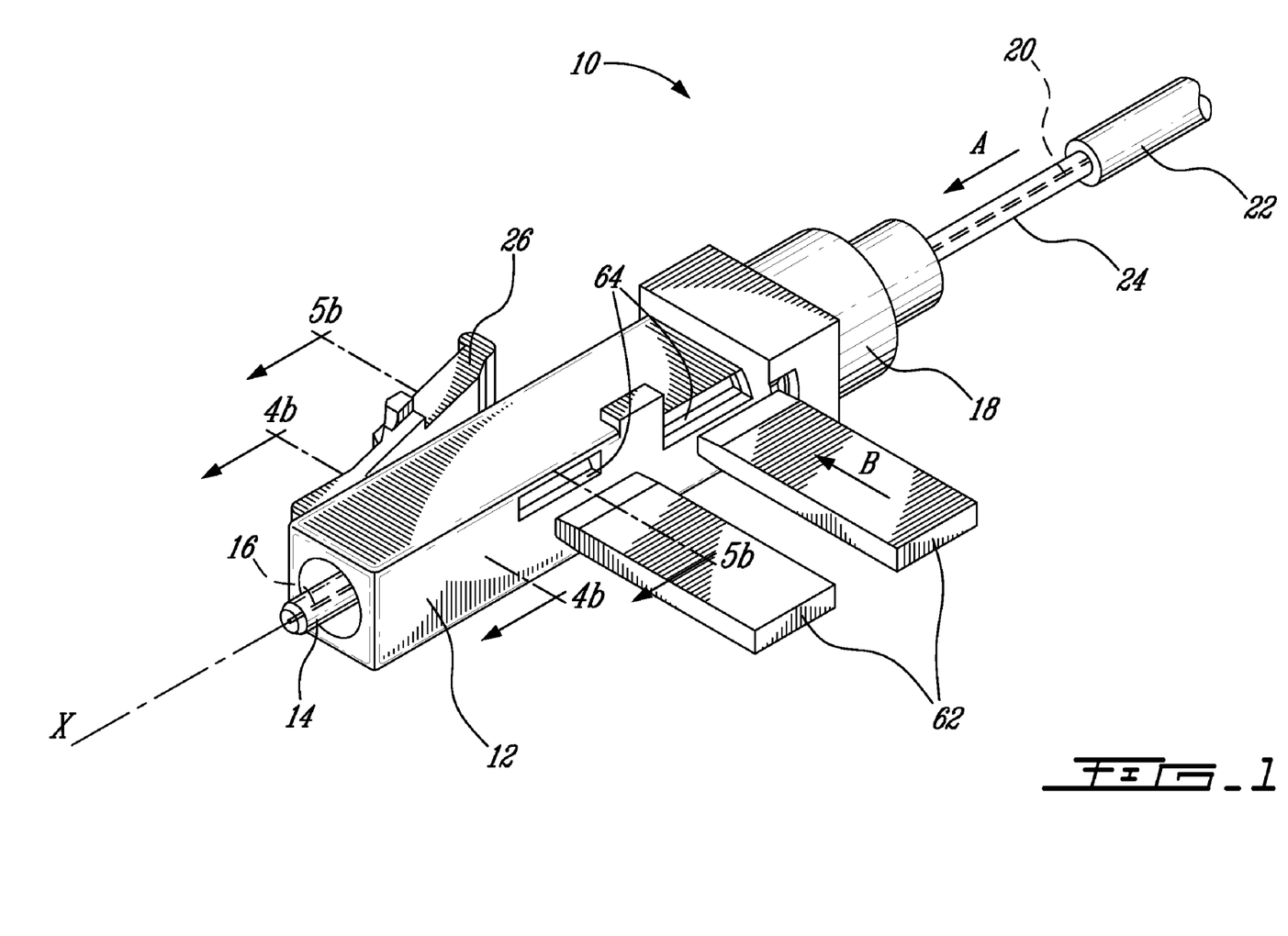
FIG. 1 is a perspective view of a field installable fiber optic connector in accordance with an illustrative embodiment of the present invention.

Referring now to FIG. 1, and in accordance with an illustrative embodiment of the present invention, a reversible fiber connector assembly, generally referred to using the reference numeral 10, will now be described. The connector 10 is illustratively a re-terminable, no-crimp Local Connector (LC)-type optical connector that comprises a housing 12 having a front end, in which a ferrule 14 having affixed thereto an optical fiber stub 16 is received. The connector 10 further comprises at a rear end thereof opposite the ferrule 14 a backbone 18 through which a mating optical fiber 20 is inserted into the connector 10 along the direction of arrow A for termination. The optical fiber 20 is illustratively prepared for insertion into the connector 10 by removing a portion of the cable jacket 22 and coated or buffered portion 24 to expose a predetermined length of the bare glass fiber 20. A latch 26 is further provided on the connector 10 for insertion and retention thereof into an appropriately configured port of a patch panel or other device (both not shown) to permit signals to pass from the optical fiber 20 to the device and vice-versa.

Figure 2:
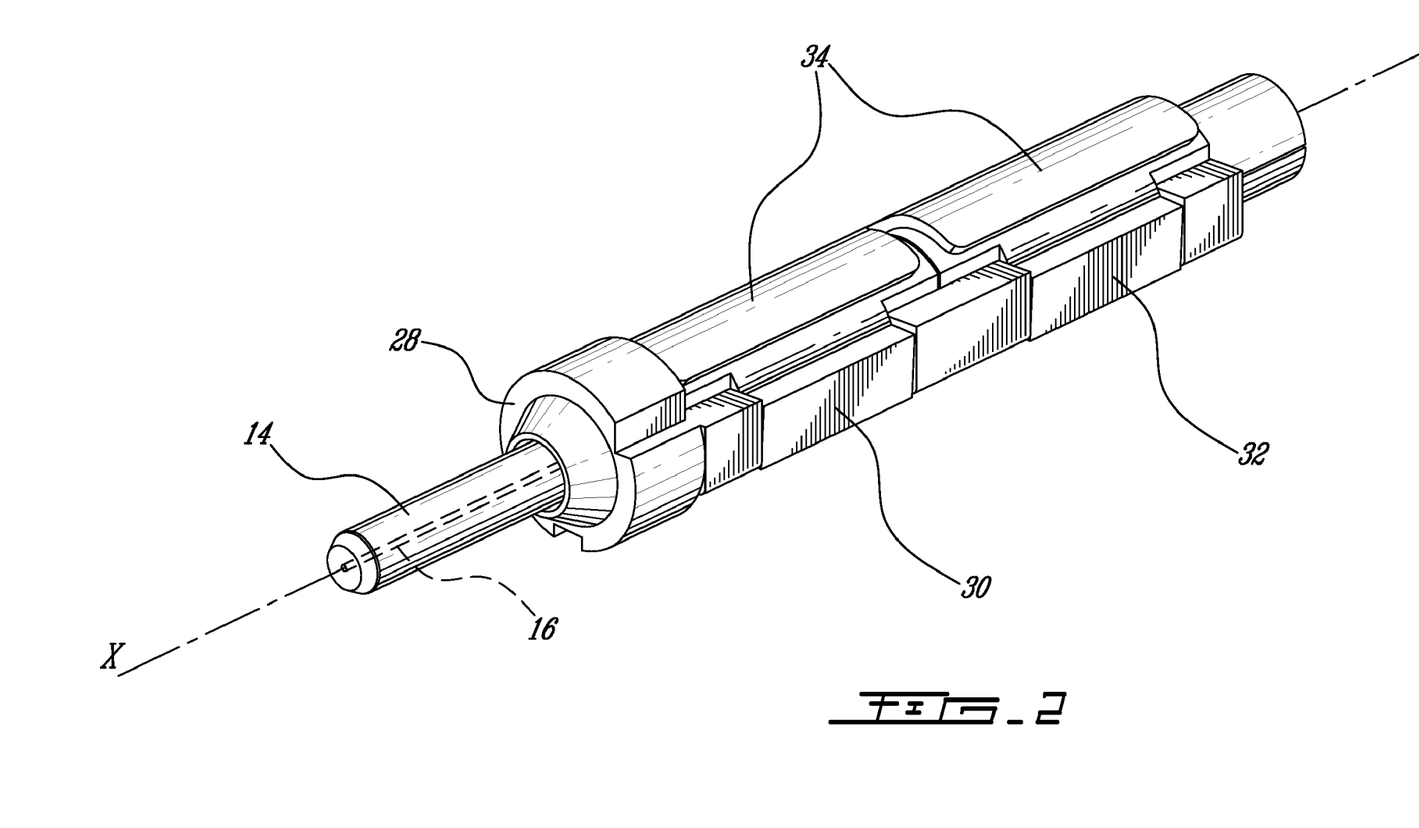
FIG. 2 is a perspective view of the clamping mechanism of the field installable connector of FIG. 1 with the splice anvils in a clamping position in accordance with an illustrative embodiment of the present invention.

Referring now to FIG. 2 in addition to FIG. 1, the connector housing 12 is illustratively elongate and comprises a cavity (not shown) extending between the front and rear ends of the connector 10 along a longitudinal axis X. An elongate ferrule holding member 28 is disposed in the housing cavity and surrounds for retention thereof the end of the ferrule 14, in which the fiber stub 16 is received. The housing 12 further comprises a clamping mechanism mounted to the ferrule holding member 28 for termination of the fibers 16, 20 and comprising a first mechanical splice anvil 30 used to maintain the fiber stub 16 and the optical fiber 20 in alignment as well as a second buffer cladding anvil 32 positioned adjacent the first anvil 30 along the axis X and used to exert pressure on the buffered portion 24 and on the bare fiber 20. The ferrule holding member 28 and the first and second anvils 30, 32 are illustratively surrounded by a clamp spring 34, which maintains the clamping mechanism closed when in the clamping position illustrated in FIG. 2, i.e. ensures that a pressure applied by the anvils 30, 32 on the fibers 16, 20 and on the buffered portion 24 of the cable 22, as will be discussed further herein below, is maintained. The clamping mechanism can then be opened using a release mechanism comprising a suitable insertion tool (not shown) adapted to apply a force to the long edges of the anvils 30, 32 tangential to the axis X, and thereby moving the anvils 30, 32 from the clamping position to a released position in which no pressure is applied by the anvils 30, 32. In the released position, the fiber 20 can then be freely inserted through the rear end of the connector 10 for mating with the fiber stub 16, as will be explained in further detail herein below.

Still referring to FIGS. 1 and 2, a biasing means such as a spring (not shown) is provided within the housing 12 to bias the ferrule holding member 28 forward in the housing 12. As known in the art, such connectors as in 10 are often terminated opposed to other similar connectors such that the ferrules as in 14 butt against one another. Provision of a biasing means such as a spring and some degree of lateral movement provide for a better connection between connectors, and therefore transfer of optical signals between the connectors. Additionally, the inside of the housing 12 and the ferrule holding member 28, are moulded with cooperating features (not shown) such that when the ferrule holding member 28 is inserted within the housing 12 it is prevented from rotating.

Figure 3A:
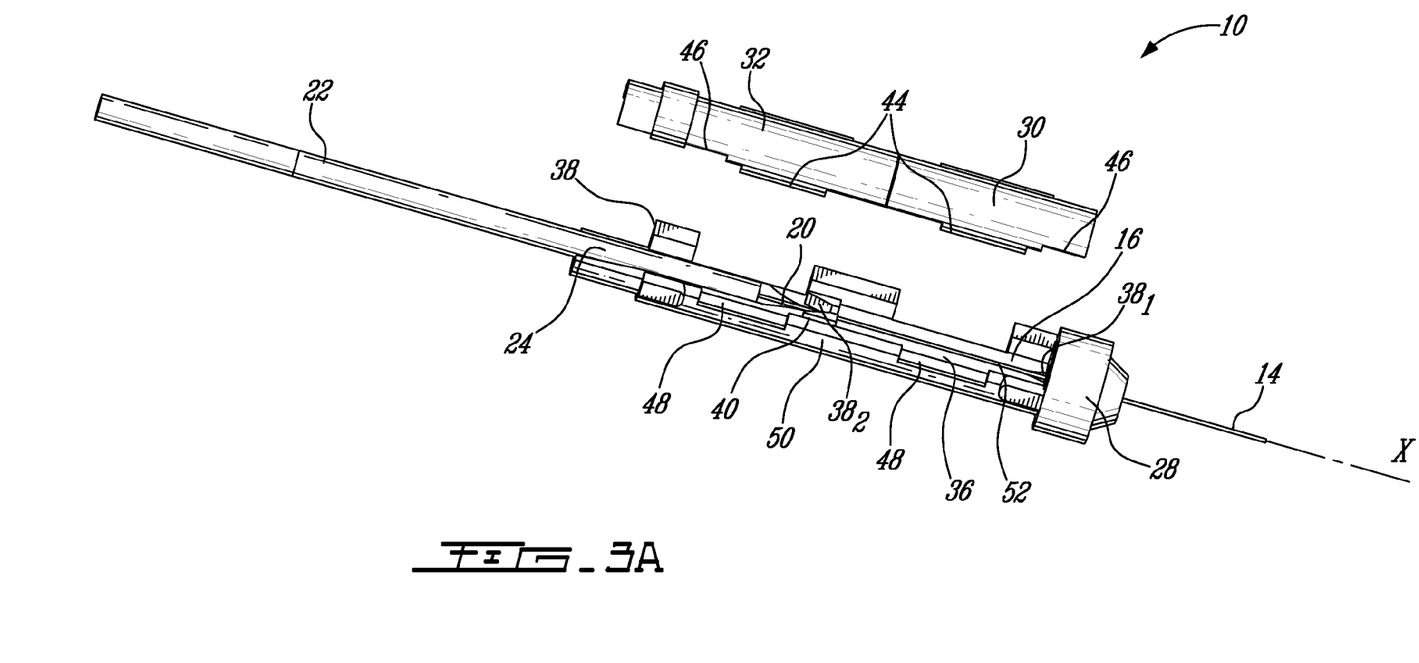
FIG. 3a is an exploded perspective view of the ferrule holding member of the field installable connector of FIG. 1.
Figure 3B:
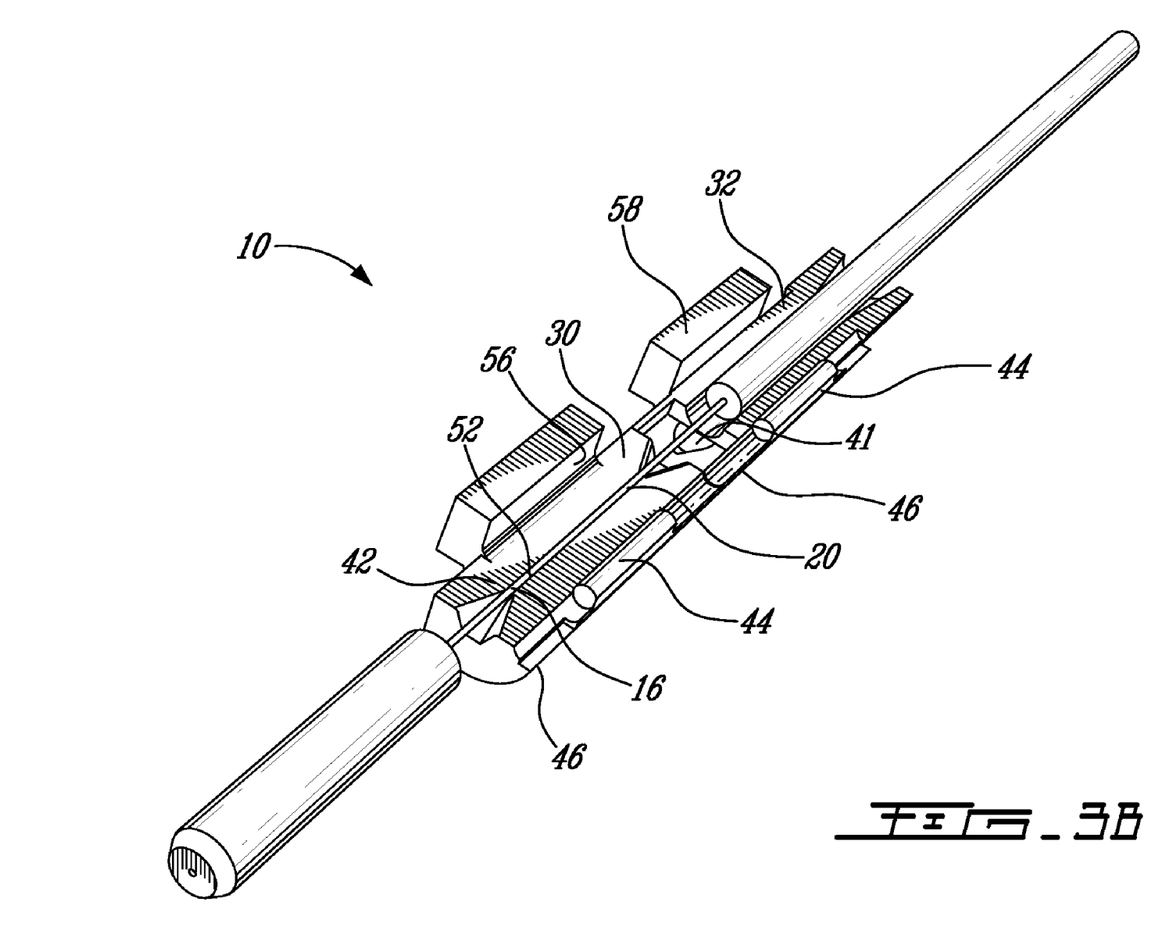

Referring now to FIG. 3a and FIG. 3b, an alignment groove (V-shaped or "V-groove") 36 is illustratively provided on a substantially flat groove surface of the ferrule holding member 28 and extends between the front and rear ends of the connector 10 along the axis X. The alignment groove 36 has at each end thereof a funnel-shaped lead-in portion 38, which provides a smooth transition for the fibers 16 and 20 to be routed into the groove 36 from either end of the connector 10, thus protecting the end face (not shown) of the fibers 16, 20 from damage. As will be apparent to a person skilled in the art, although a V-groove has been shown for illustrative purposes, the alignment groove 36 could have any other shape (e.g. square or "U-groove") suitable for receiving and aligning the fiber stub 16 and the adjoining optical fiber 20 within the connector 10 so as to ensure accurate termination. Also, although only one alignment groove 36 has been illustrated, it will be apparent to a person skilled in the art that the connector 10 may be provided with a plurality of alignment grooves as in 36 to accommodate a dual-fiber or multi-fiber connector having two (2) or more fiber stubs as in 16.

Still referring to FIG. 3a and FIG. 3b, the first groove portion $38_1$ is illustratively positioned adjacent the ferrule 14 to facilitate the positioning and centering of the fiber stub 16 inside the ferrule 14 and of a protruding end (not shown) of the fiber stub 16 within the alignment groove 36. For this purpose, the ferrule 14 illustratively comprises an axial bore (not shown), which is aligned with the alignment groove 36 and in which the fiber stub 16 is disposed with the protruding end extending away from the front end of the housing 12. The second groove portion $38_2$ is used to position the buffered portion 24 and accordingly insert the optical fiber 20 within the connector housing 12 along the alignment groove 36 when the anvils 30, 32 are in the released position, as discussed further herein below. In this released position, the fiber 20 can be advanced freely within the housing 12 until the fiber 20 reaches a final centered position and an optical fiber splicing face (not shown) of the fiber 20 extends within the housing 12 from the rear end of the connector 10 towards the front end to make physical contact with a stub splicing face (not shown) of the fiber stub 16 for termination. Illustratively, the ferrule holding member 28 further comprises a raised funnel-like guide 40 which ensures that on insertion the optical fiber 20 is directed into the alignment groove 36. The inside surface of the rear anvil 32 is illustratively moulded with a projection 41 which engages a slot in the guide 40, thereby limiting the travel of the optic fiber 20.

Still referring to FIG. 3a and FIG. 3b, the anvils 30, 32 are illustratively positioned adjacent the groove 36, with a clamping surface 42 of the anvil 30 adjacent and overlapping the stub splicing face and the optical fiber splicing face of the adjoining fiber 20 and fiber stub 16. As shown, each of the anvils 30, 32 is provided with a hinge flange 44 along a first long edge 46 thereof which on assembly fits snugly into a respective hinge flange receiving notch 48, a pair of which are provided along a first long edge 50 of the elongate ferrule holding member 28. As a result, once assembled the first long edges as in 46 of the anvils 30, 32 are each maintained in a hinged relationship with the first long edge 50 of the elongate ferrule holding member 28. In the clamping position, the clamp spring 34 exerts a force on the anvil 30 which in turn exerts a clamping force on the adjoining optical fiber 20 and fiber stub 16, which are thereby compressed to better retain the fibers 16 and 20 in alignment relative to one another within the alignment groove 36. In a similar fashion, a clamping force is also exerted by the anvil 32 (illustratively simultaneously to the clamping force applied by the anvil 30) on the buffered portion 24 of the cable 22 as well as on the optical fiber 20 to better retain the latter within the connector housing 12. The optical fiber 20 is therefore more accurately terminated and the connector 10 can subsequently be mated to an appropriate port or other connector (both not shown). Illustratively, index-matching gel may be provided in the area 52 of the groove 36 where the fibers 16 and 20 mate to refractively limit signal loss at the interface of the optical fiber 16 and the fiber stub 20 once the latter are properly aligned.

Figure 4A:
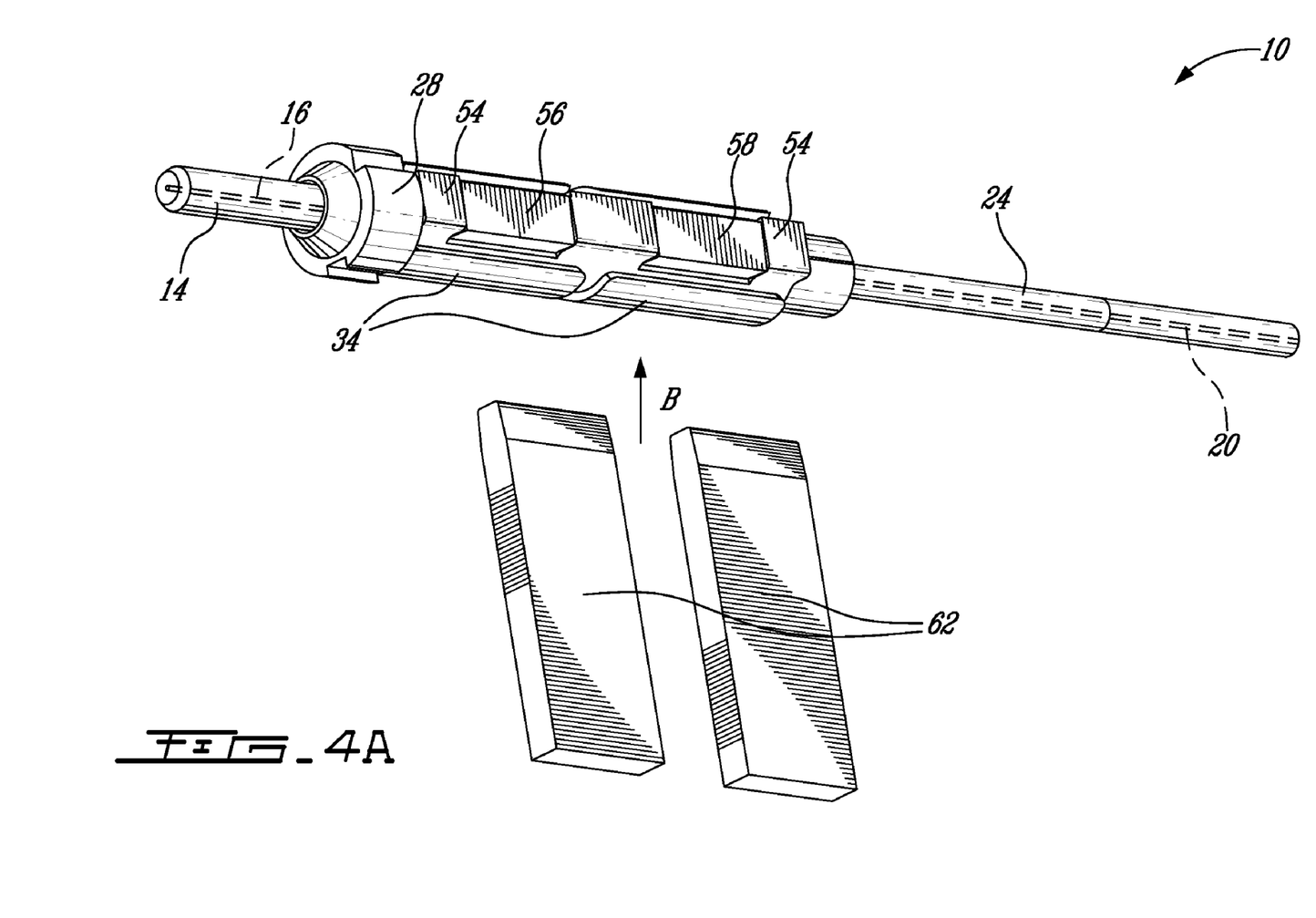
FIG. 4a is a perspective view of a ferrule holding member removed from the housing of the field installable connector of FIG. 1 with the splice anvils in a clamping position and insertion tools ready to be inserted into the connector housing for moving the splice anvils to a released position.
Figure 4B:
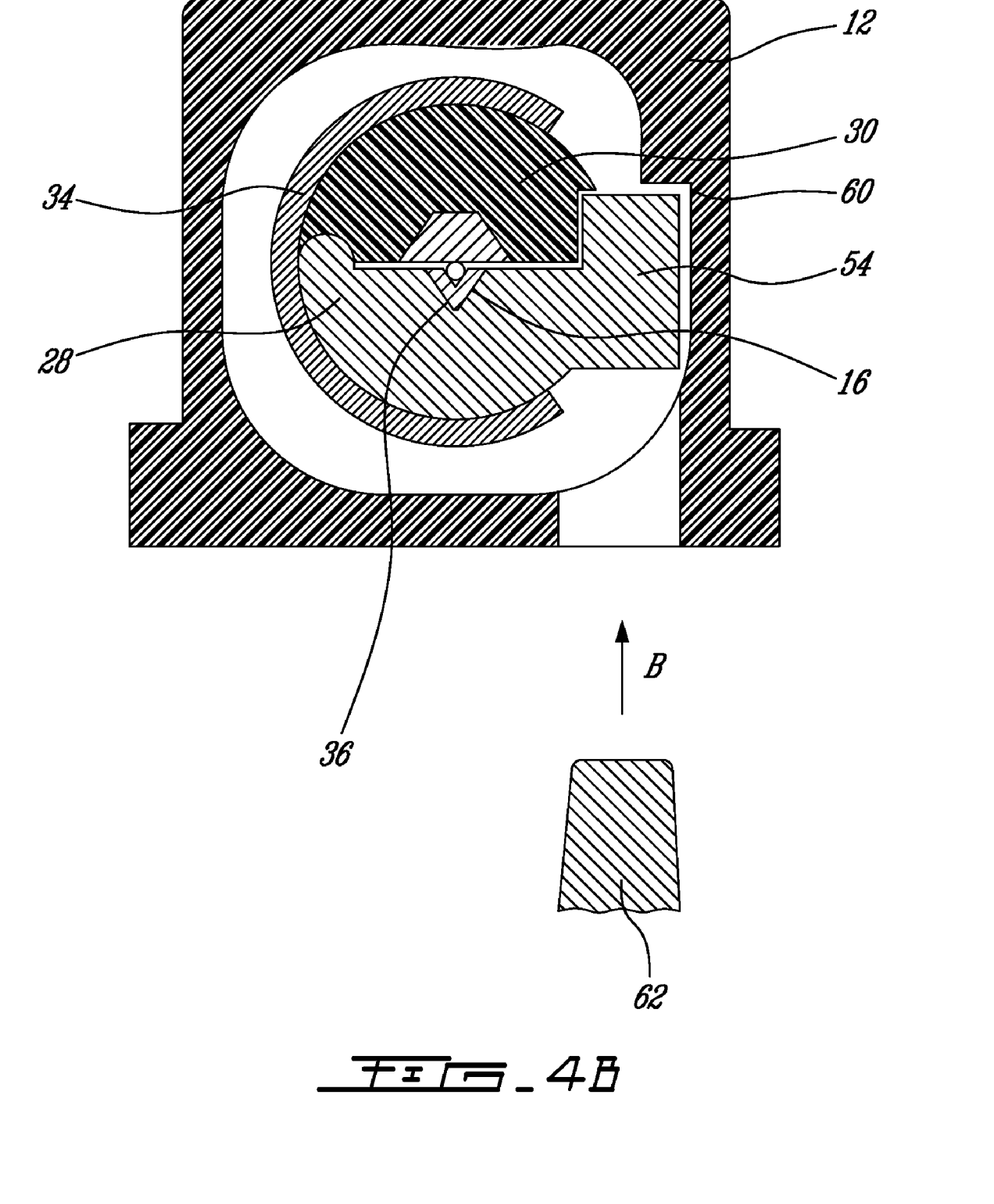
FIG. 4b is a cross-sectional view taken along the line 4b-4b of the field installable connector of FIG. 1.

Referring now to FIG. 4a and FIG. 4b, a plurality of extended projections or beams as in 54 illustratively extend tangentially to the outer surface of the ferrule holding member 28. The anvils 30, 32 further respectively each comprise an extended boss 56, 58, which extends tangentially to an outer surface of the anvils 30, 32 and are used as cantilevers for moving the clamping mechanism to the released position. When in the closed position illustrated in FIG. 4a, the extended bosses as in 54 illustratively project towards the same side in alternate positions to one another and are held in position within the housing 12 by an inner corner 60 of the housing 12 against which they engage, the corner 60 acting as a stop. In this way the elongate ferrule holding member 28 cooperates with the inside of the housing 12 and is prevented from rotating.

Still referring to FIG. 4a and FIG. 4b, installation tools as in 62, which are illustratively inserted into the housing 12 along the direction of arrow B to move the clamping mechanism to the released position, for example for insertion of the optical fiber 20 into the housing 12 for mating with the adjoining fiber stub 16 (as discussed herein above) or removal of the terminated fibers 16, 20. Each tool 62, illustratively of elongate rectangular shape, is adapted to fit within insertion openings (reference 64 in FIG. 1) provided in the housing 12 adjacent the bosses 56 and 58 and opposite the inner corner 60 of the housing 12.

Figure 5A:
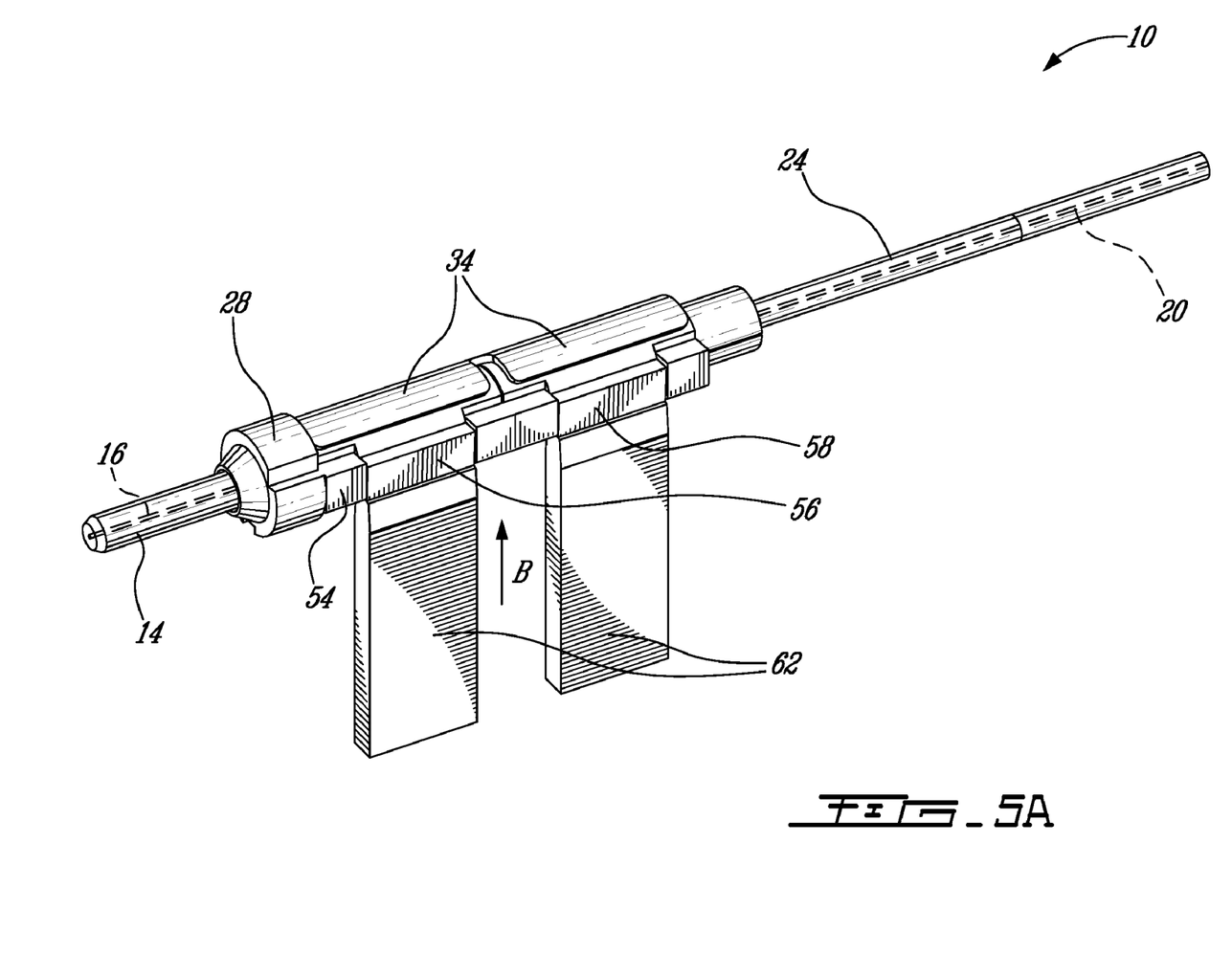
FIG. 5a is a perspective view of the clamping mechanism of a ferrule holding member removed from the housing of the field installable connector of FIG. 1 with insertion tools inserted into the connector housing.
Figure 5B:
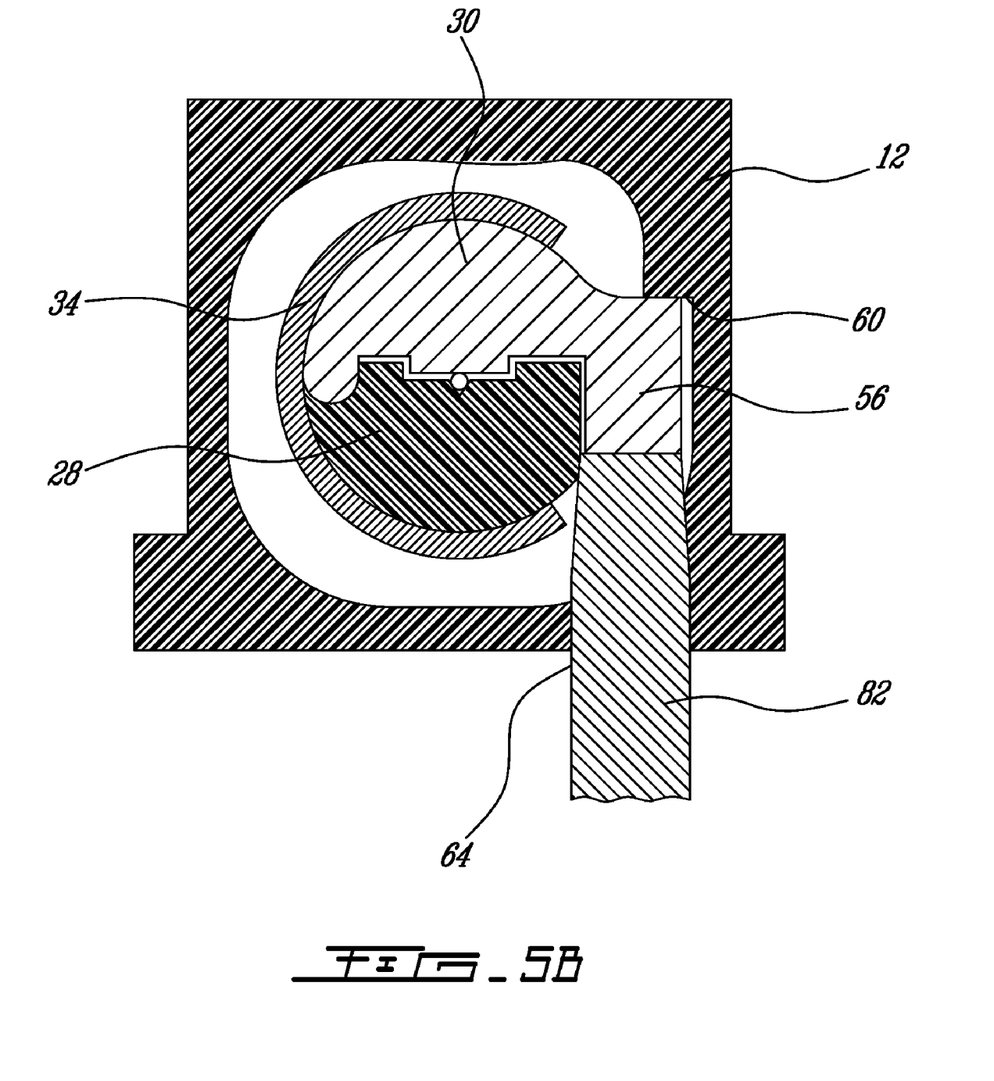
FIG. 5b is a cross-sectional view taken along the line 5b-5b of the field installable connector of FIG. 1 with an insertion tool inserted into the connector housing.

Referring now to FIG. 5a and FIG. 5b, in operation the housing 12 is held securely and the tools 62 are inserted (either simultaneously or not) into a respective one of the openings (reference 64 in FIG. 1). As the elongate ferrule holding member 28 is held securely through cooperative engagement with the inside of the housing 12, when the tool 62 engages a respective boss 56, 58 and a mechanical force exerted against a clamping force (direction of arrow B), the bosses 56, 58 are moved such that the clamping surfaces (reference 42 in FIG. 3b) of the anvils 30, 32 are rotated away from the adjoining fibers 16, 20 and the clamping forces exerted on both fibers 16, 20 and on the buffered portion 24 of the cable (reference 22 in FIG. 1) released. The optical fiber 20 may then for example be withdrawn from the connector 10 (after having been terminated) and subsequently reinserted for another attempt at a successful connection in the event where optical continuity between the fibers 16 and 20 has been deemed unacceptable. Each anvil 30, 32 can thus be moved from the clamping position to the released position independently of the other anvil 30, 32 by insertion of a tool 62 in the appropriate insertion opening 64, such insertion and the corresponding actuation of the clamping mechanism of the anvils 30, 32 occurring either simultaneously or not. Of note is that the extended bosses 56, 58 are independent and displaced from another, thereby allowing for some independence in when they are actuated.

Referring back to FIG. 1, it is therefore apparent that the system of the present invention has the added advantage of being simple as well as non-destructively reusable. This is effected by inserting the tools as in 62 into the insertion openings as in 64 to move the anvils 30, 32 to the released position or alternatively extracting the insertion tools as in 62 from the insertion openings as in 64 to return the anvils 30, 32 to the original clamping position. The connector 10 thus eliminates the need for any extra and irreversible operation to crimp a lead-in tube or annular crimp ring about the buffered portion 24 of the fiber cable 22 and provide strain relief to the interface of the aligned fiber stub 16 and field fiber 20, as is the case of conventional connectors. As the crimp is destructive, such crimping typically degrades the fiber interface and such degraded connection cannot be improved short of cutting away the wasted connector, re-stripping, re-cleaving, and re-terminating the optical fiber 20 with a new fiber stub 16 in a new connector 10.

In addition and still referring to FIG. 1, the assembly of the present invention is advantageously adaptable to various types of fiber connectors, such as fiber connectors conformed to the Straight Tip (ST), Standard Connector (SC), or hybrid fiber and electrical contact standards. Moreover, the use of two (2) anvils as in 30 and 32 enables to more accurately control the termination of the optical fiber 20 as pressure can be applied on both the buffered portion 24 and the length of the fiber 20 (by anvil 32) as well as on the mating region (by anvil 30), thus better aligning and retaining the fibers 16 and 20 within the connector 10.

Although the present invention has been described hereinabove by way of specific embodiments thereof, it can be modified, without departing from the spirit and nature of the subject invention as defined in the appended claims.

What is claimed is:

1. A connector for reversibly terminating a cable comprising a buffer cladding surrounding an optical fiber wherein an end portion of the cable is exposed to reveal the optical fiber, the connector comprising:

an elongate member comprising a first end, a second end and an alignment groove extending at least partially along a member surface thereof between said first end and said second end, wherein the exposed optical fiber is positioned within said groove and extending from said second end;

a ferrule comprising a front face, a rear end positioned adjacent said first end, an axial bore aligned with said groove and an optical fiber stub disposed in said bore and extending from said front face into said groove such that a stub splicing face of said optical fiber stub is positioned opposite an optical fiber splicing face of the optical fiber;

a clamping assembly comprising a splice anvil comprising a fiber clamping surface positioned facing said member surface and overlapping said stub splicing face and said optical fiber splicing face and an actuating boss attached to a long edge of said splice anvil;

a spring for biasing said clamping surface towards said member surface; and a housing encompassing said elongate member, said clamping assembly and said spring wherein said elongate member and an inside of said housing comprise cooperating features preventing said elongate member from rotating within said housing, said housing further comprising an opening positioned adjacent said actuating boss;

wherein said clamping assembly is adapted for opening by engaging said actuating boss with a tool inserted through said opening and applying a force to said actuating boss such that said clamping surface is moved away from said member surface against said spring.

2. The connector of claim 1, further comprising a buffer clamping assembly comprising a buffer cladding anvil comprising a buffer cladding clamping surface positioned facing said member surface, a second actuating boss attached to a long edge of said buffer cladding anvil and a second opening in said housing positioned adjacent said second actuating boss wherein said buffer clamping assembly can be opened by engaging said second actuating boss with a tool inserted through said second opening and applying a force to said second actuating boss such that said cladding clamping surface is moved away from said member surface against said spring.

3. The connector of claim 1, wherein said opening comprises a slot and said tool is adapted for insertion into said slot.

4. The connector of claim 1, wherein said clamping assembly and said buffer clamping assembly can be opened independently.

5. The connector of claim 1, wherein said housing conforms substantially to that of an LC type connector.

6. The connector of claim 1, wherein said housing is adapted for insertion into an LC type receptacle.

7. The connector of claim 1, wherein said housing further comprises a latch for releasable securing the connector to a receptacle.

8. A connector assembly for reversibly terminating a cable comprising a buffer cladding surrounding an optical fiber wherein the cladding is removed from an end portion of the cable to reveal the optical fiber, the connector assembly comprising:

an elongate member comprising a first end, a second end and an alignment groove extending at least partially along a member surface thereof between said first end and said second end, wherein the exposed optical fiber is positioned within said groove and extending from said second end;

a ferrule comprising a front face, a rear end positioned adjacent said first end, an axial bore aligned with said groove and an optical fiber stub disposed in said bore and extending from said front face into said groove such that a stub splicing face of said optical fiber stub is positioned opposite an optical fiber splicing face of the optical fiber;

a clamping assembly comprising a splice anvil comprising a fiber clamping surface positioned facing said member surface and overlapping said stub splicing face and said optical fiber splicing face;

a spring for biasing said clamping surface towards said member surface; and a housing encompassing said elongate member, said clamping assembly and said spring wherein said elongate member and an inside of said housing comprise cooperating features preventing said elongate member from rotating within said housing;

wherein when said housing is secured and a force is applied to a first long edge of said splice anvil in a direction tangential to said axial bore and away from said member surface, said splice anvil rotates about a second long edge of said splice anvil in contact with said elongate member and said clamping surface is moved away from said member surface against said spring.

9. The connector assembly of claim 8, wherein said clamping assembly further comprises an actuating boss attached to said first long edge of said splice anvil, said housing further comprises an opening positioned adjacent said actuating boss and further wherein said clamping assembly is adapted for opening by engaging said actuating boss with a tool inserted through said opening and applying said tangential force to said actuating boss.

10. The connector assembly of claim 8, further comprising a buffer clamping assembly comprising a buffer cladding anvil comprising a buffer cladding clamping surface positioned facing said member surface wherein when said housing is secured and a second force is applied to a first long edge of said buffer cladding anvil in a direction tangential to said axial bore and away from said member surface, said buffer cladding anvil rotates about a second long edge of said buffer cladding anvil in contact with said elongate member and said buffer cladding clamping surface is moved away from said member surface against said spring.

11. The connector assembly of claim 10, wherein said buffer clamping assembly comprises a second actuating boss attached to said first long edge of said buffer cladding anvil and a second opening in said housing positioned adjacent said second actuating boss and further wherein said buffer clamping assembly is adapted for opening by engaging said second actuating boss with a tool inserted through said second opening and applying said second tangential force to said second actuating boss.

\* \* \* \* \*